United States Patent Office 3,586,489
Patented June 22, 1971

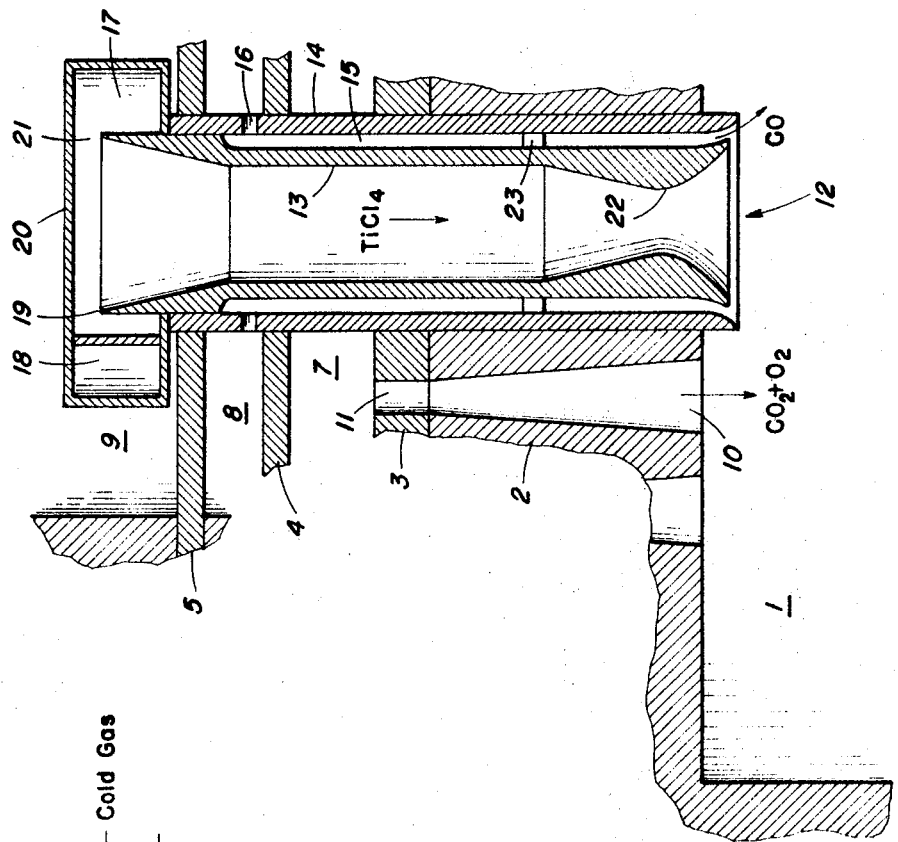
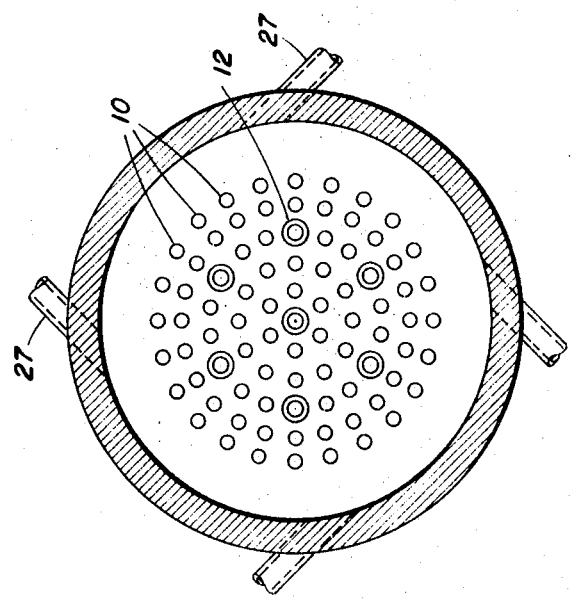

3,586,489
DEVICE FOR THE MANUFACTURE OF FINE
PARTICLE SIZE TITANIUM DIOXIDE
Giovanni Hilgers, Hau, Post Bechen, Gerhard Hitzemann, Giershofen, Post Dierdorf, and Achim Kulling, Opladen, Germany, assignors to Titangesellschaft mbH, Leverkusen, Germany
Filed Aug. 29, 1968, Ser. No. 756,107
Int. Cl. C01g 23/04
U.S. Cl. 23—277           10 Claims

ABSTRACT OF THE DISCLOSURE

A pyrogenic $TiO_2$ material is produced by the vapor phase reaction of gaseous titanium tetrachloride with oxygen in the presence of hot combustion gases produced by combustion of carbon monoxide and oxygen wherein all of the oxygen required for the reaction is introduced in admixture with carbon monoxide, the gaseous $TiCl_4$ being introduced into the reaction chamber as one or more rotating jet streams each surrounded by a mantle of gaseous carbon monoxide which reacts with the surrounding hot combustion gases plus free oxygen to produce a spatially fixed circular flame at a predetermined distance below the point of introduction of each rotating stream of gaseous $TiCl_4$ as a consequence of which the reaction of the gaseous $TiCl_4$ and free oxygen always takes place at substantially the same location i.e. reaction zone in the reaction chamber and owing to the rotary movement of each $TiCl_4$ jet stream the reaction zone is relatively short as a consequence of which the residence time of the $TiO_2$ particles formed therein is short and of substantially equal duration thereby producing a uniform fine-grained product. The means used for reacting the gaseous components in the manner hereinabove described comprises apparatus designed to introduce the gaseous $TiCl_4$ into the upper end of a reaction chamber through one or more concentric tube feed pipes mounted in a gas permeable plate having a multiplicity of gas passages surrounding the $TiCl_4$ feed pipes through which passages mixtures of CO and oxygen at reacting temperature are introduced into the reaction chamber to provide hot combustion gases plus free oxygen for effecting the reaction of the gaseous $TiCl_4$ and oxygen. The upper end of the reaction chamber is also provided with inlet pipes for introducing a cold gas tangentially into the chamber for sweeping the walls free of $TiO_2$ deposits.

BACKGROUND OF THE INVENTION

The invention is concerned in general with a device for the manufacture of fine particle size titanium dioxide by reacting titanium tetrachloride with oxygen and more particularly in which auxiliary heat for the reaction is supplied by the combustion of carbon monoxide and oxygen. Heretofore this has been done either by introducing the titanium tetrachloride, oxygen and carbon monoxide into a reaction chamber via concentric tubes, in which reaction chamber the carbon monoxide as well as the titanium tetrachloride are reacted simultaneously with the oxygen; or else, the carbon monoxide is reacted with oxygen in a precombustion chamber where the gas mixture is heated as high as possible and this hot gas mixture is then introduced into a second chamber where it contacts the titanium tetrachloride and, as the case may be, additional oxygen.

Also numerous suggestions have been forth-coming according to which the reacting gases are made to flow from a relatively small burner tube into a wide reaction chamber and the reaction is completed in this wide chamber. However in order to obtain titanium dioxide with uniformly fine grain it is necessary that in this procedure the individual gases be quickly mixed with each other and reacted completely in a small reaction zone without the formation of any large reverse-flow of gas. On the other hand, the reaction must not take place directly at the tube orifices or near the chamber wall since in that case titanium dioxide deposits are formed which modify the gas flow conditions in the reaction zone adversely. For this reason the streams of gas must not be too large in diameter nor of to high velocity. The consequence is that only relatively little amount of titanium tetrachloride may be put through the burner per unit of time. In addition, disturbances in the flow of the gas stream at the place of transition from the small burner to the wide reaction chamber occur rather easily so that the products formed are of non-uniform quality.

In order to overcome these disadvantages it has been suggested that the titanium tetrachloride, oxygen and carbon monoxide be introduced into the reaction chamber via a fairly large number of tubes which enter the reaction chamber over a large cross-sectional area thereof (German Auslegeschrift 1,036,221). In this manner the titanium tetrachloride is reacted in the presence of auxiliary flame produced by combustion of the carbon monoxide. Hence high temperatures are developed at the orifices of the tubes and consequently deposits of titanium dioxide start to form in their immediate propinquity and quickly close up the tube orifices. Also the tube orifices are exposed to the hot reaction gases which may result in their rapid destruction.

Efforts have been made to avoid premature reactions of this nature by introducing the titanium tetrachloride and oxygen separately by means of an intermediate layer of carbon monoxide or an inert auxiliary gas. In the one case all gases are introduced in laminar flow into the reaction chamber (Dutch patent application No. 6,509,-025) but it has been found that the flow rates of the individual gas streams must be adjusted very exactly to each other. Moreover a very long reaction zone is produced as a consequence of which the titanium dioxide particles produced have different and, in general, too long residence times so that the product becomes non-uniform and too coarse. In another case at least one of the streams of gas is given a rotary movement (Swiss Pat. No. 276,037) whereby the reaction retardation is, indeed, nullified. However owing to the fact that all of the carbon monoxide is reacted simultaneously with the titanium tetrachloride high temperatures develop near the burner mouth so that the protection of the burner orifices intended by the intermediary gas layer is ineffective unless a large amount of inert gas is used. This however has the disadvantage of effecting dilution of the reaction product gases whereby their reuse for production of titanium tetrachloride is rendered difficult. In addition, the ignition of the gases does not always take place at the same place owing to the intermediate gas layer and the relatively low temperature of the oxygen which contribute to the production of titanium dioxide of poor quality.

In still another case all of the carbon monoxide has been reacted with oxygen in a precombustion chamber (British Pats. Nos. 1,010,061 and 1,047,713, and Dutch patent application No. 298,872) as a consequence of which very high temperatures occur in the precombustion chamber, i.e. up to 2000° C., and hence this must be manufactured of special refractory materials. Moreover the reaction of the gases takes place throughout a long reaction zone with the result that the titanium dioxide is non-uniform.

SUMMARY OF THE INVENTION

The present invention relates to improved vapor phase process for producing pyrogenic $TiO_2$ material by reacting $TiCl_4$ with oxygen in the reaction zone of a reaction chamber wherein auxiliary heat for the reaction is supplied by burning CO with oxygen in the presence of an inert gas, as the case may be, the process being characterized in that the carbon monoxide together with all of the oxygen required for the reaction are admixed within a manifold mounted on the upper end of the reaction chamber and pass down through a gas permeable plate from which the admixed gases plus free oxygen issue into the reaction chamber as a hot mixture of $CO_2$ and oxygen in substantially laminar flow and at low velocity. The gaseous $TiCl_4$ is fed into these hot combustion gases via one or more feed pipes which give a rotary movement to the streams of $TiCl_4$ each stream of $TiCl_4$ gas being surrounded by a concentric mantle of CO, and an inert gas as the case may be, wherein the CO serves to initiate the reaction of the $TiCl_4$ with the free oxygen in the hot combustion gases. The incoming streams of gaseous $TiCl_4$ are thus surrounded by substantially fixed circular flames which are of relatively short length and delineate a relatively short reaction zone in the upper end of the reaction chamber as a consequence of which the residence time of the individual particles of $TiO_2$ in the reaction zone is short and of equal duration thereby producing a product of uniform grain size.

DESCRIPTION OF THE DRAWINGS

FIG. 1 is a fragmentary elevation in section of the upper end of a reaction chamber showing details of the burner manifold mounted thereon;

FIG. 2 is a plan view of the reaction chamber on line 2—2 of FIG. 1; and

FIG. 3 is an enlarged fragmentary elevation in section of the upper end of the reaction chamber of FIG. 1 showing details of one of the $TiCl_4$ feed pipes mounted therein.

DESCRIPTION OF PREFERRED EMBODIMENT

The preferred embodiment of the invention is illustrated in the drawings wherein the reaction chamber 1 is shown having a top end-closure, hereinafter referred to as a gas-permeable plate 2. The latter is preferably made of a refractory ceramic material and may be a gas-permeable ceramic frit or the plate 2 may be constructed with a plurality of gas passages 10 increasing in diameter uniformly from the top of the plate to the bottom thereof (see especially FIG. 3). A mixture of CO and $O_2$ is adapted to be fed through the gas permeable plate 2 from a burner manifold surmounted thereon and to issue from the permeable plate 2 into the reaction chamber 1 in the form of a plurality of individual jets of a hot mixture of $CO_2$ and oxygen, in laminar flow and at relatively low linear velocity. In fact the linear velocities of the several gas streams are sufficiently low that the individual streams combine almost instantly upon entering the reaction chamber to form a single homogeneous stream of hot combustion gas plus free oxygen having practically no turbulence and filling the entire cross-sectional area of the reaction chamber. This same form of homogeneous gas stream will be produced when using a ceramic frit in lieu of a plate having gas passages formed therein. The hot combustion gases will attain a temperature of over about 1000° C.

The gaseous titanium tetrachloride is adapted to be blown into these homogeneous hot combustion gases in the form of one or more $TiCl_4$ gas streams having rotary movement. Moreover each titanium tetrachloride jet is adapted to be surrounded, as hereinafter described, by a mantle of CO and an inert gas, as the case may be, which react with the hot combustion gases containing free oxygen to form a spatially fixed circular flame which begins several millimeters below the point of introduction of the titanium tetrachloride jet streams. By means of these circular flames the reaction of the titanium tetrachloride with free oxygen occurs always at substantially the same location. Owing to this fact and the homogeneous nature of the hot combustion gases, the reaction runs very uniformly and a good product is obtained.

One advantage of the process according to the invention is seen in the possibility of employing burners having any desired large cross-section wherein optimal reaction conditions prevail throughout. Moreover, it is possible to process large amounts of titanium tetrachloride per unit of time. Practically no deposits of titanium dioxide are formed either on the gas permeable plate or at the $TiCl_4$ tube mouths. Also owing to the largely laminar flow conditions prevailing in the propinquity of each titanium tetrachloride jet, no disturbing back currents occur. And further, owing to its rotary movement each titanium tetrachloride jet is mixed rapidly with the hot gases containing free oxygen and reaction therewith within a relatively short distance so that only short and largely equal residience times result for the titanium dioxide particles as a consequence of which the $TiO_2$ product formed is fine-grained and very uniform.

Owing to the fact that only a part of the total carbon monoxide required is burned within the burner manifold located above the gas permeable plate only moderately high temperatures are reached and hence it is, therefore, possible to employ any type of ceramic material for the gas permeable plate; in addition to that the danger of back-firing through the inlet ends of the gas passages is out of the question owing to the low carbon monoxide content. It has been found advantageous from a material point of view to introduce only so much carbon monoxide into the burner manifold that by its combustion the temperature of the gas permeable plate is between 1000° C. and 1700° C. The amount of carbon monoxide fraction to be sent through the gas permeable plate 2 for this purpose depends on the size of the burner, on the amount of titanium tetrachloride to be reacted and on the kind and volume of the inert gases sent through additionally, and may be easily determined by experiments. If, for example, a total of 40 parts by volume of carbon monoxide must be reacted with 100 parts by volume of oxygen, then, at normal load in the reaction chamber, 20 parts by volume carbon monoxide may be fed through the gas permeable plate and 20 parts by volume carbon monoxide via the mantle jets surrounding the $TiCl_4$ jets. With a high load in the reaction chamber 30 parts by volume carbon monoxide may be added through the gas permeable plate and 10 parts by volume via the mantle jets.

Carbon monoxide and oxygen are advantageously mixed with each other prior to being fed through the gas permeable plate 2, however, it is possible to introduced both gases separately. In the former case, and when using a gas permeable plate 2 having apertures 10 formed therein (see FIG. 3) it has been found beneficial to gradually enlarge the diameters of these apertures 10 in the manner of a diffuser. An abrupt increase in the diameters of the apertures 10 is not as desirable from the point of flow techniques but is also possible. Owing to the small cross-section of the entrance ends 11 of these apertures 10, or by the small cross-section of the apertures in a ceramic frit, a backfiring of the flames is avoided. By using diffuser type apertures the velocity of the gases issuing therefrom is reduced (by the continuous increase of the cross-section of the apertures) so that the gas flow is largely laminar when emerging from the gas permeable plate 2. Besides that, no gas is sucked into the exit ends of the apertures by injector effect from the reaction zone.

In addition to carbon monoxide and oxygen, an inert gas may be fed into the gas permeable plate, for example, nitrogen, chlorine or a reaction product gas freed of titanium dioxide, for additional lowering of the temperature in the plate. In this manner at least a part of the oxygen may be replaced by air.

It has also been found that the characteristics, in particular the particle size of the titanium dioxide formed may be affected by the amount of gas introduced into the reaction zone via the gas mantle surrounding the TiCl₄ jet. It is, therefore, particularly advantageous to mix an inert gas, for example, nitrogen, chlorine or a reaction product gas freed of titanium dioxide and cooled down, with the carbon monoxide forming the gas mantle. The amount of inert gas may be up to about 100% by volume of the carbon monoxide which is added in the mantle gas. In this respect it has been found that the particle size of the titanium dioxide decreases with an increase in the amount of inert gas added. The particle size of the $TiO_2$ may also be modified by the velocity of each mantle jet.

The required rotary movement of the incoming jets of titanium tetrachloride is affected by introducing the titanium tetrachloride tangentially into the upper end of each $TiCl_4$ feed pipe.

The wall of the reaction chamber may be rinsed by tangentially introduced cold gas and thereby be kept free of titanium dioxide deposits. This process has been described in detail in the German patent application T 29,994 IVa/12n.

The titanium tetrachloride is introduced in the form of vapor. A certain preheating of the titanium tetrachloride above its boiling point is possible. In order to improve the properties of the titanium dioxide formed, small amounts of additional substances may be added to the titanium tetrachloride in a manner known as such, for example, aluminum chloride, silicon tetrachloride, zirconium tetrachloride or steam. The other gases i.e. oxygen, CO and inert gases, if used, may also be preheated; it is also specially advantageous under certain circumstances to preheat the oxygen and thereby effect a saving in carbon monoxide.

A preferred device suitable for carrying out the process according to the invention consists of a vertically arranged reaction chamber, a gas permeable ceramic plate at the upper end of the reaction chamber having one or more axially arranged $TiCl_4$ feed pipes which extend through the permeable plate and terminate somewhat below it. In this connection each feed pipe consists of two concentric tubes fitted within each other but spaced apart to form an annular passage for the mantle gases. A cap-like housing is provided on the upper end of the inner tube of each $TiCl_4$ feed pipe and provided with one or more tangential inlets for effecting rotary movement to the $TiCl_4$ as it is fed from the chamber 9 of the burner manifold into the $TiCl_4$ feed pipe.

The preferred device for carrying out the invention is shown in the drawings. The device consists of a vertically arranged cylindrical reaction chamber 1 which is closed at its upper end by a ceramic gas permeable plate 2. Above the gas permeable plate 2 is a burner manifold consisting of four horizontal plates 3, 4, 5 and 6 supported in vertically spaced parallel relationship by the cylindrical wall of the manifold wherein the lowest plate 3 seats directly on the gas permeable plate 2. There are three interspaces or chambers 7, 8 and 9 between the aforesaid four plates. In this embodiment of the invention the gas permeable plate 2 is provided with numerous apertures 10 (see FIGS. 2 and 3) which are connected with the lowest chamber 7 by small bore holes 11 formed in the plate 3. The several $TiCl_4$ feed pipes 12 extend verticallly through axially aligned apertures in the gas permeable plate 2 and the plates 3, 4 and 5. The plurality of apertures 10 and $TiCl_4$ feed pipes 12 in the gas permeable plate 2 occupy a large part of the cross-section surface of the reaction chamber but leave a narrow annular zone open near the chamber wall.

FIG. 3 is a fragmentary enlargement of FIG. 1 showing a single $TiCl_4$ feed pipe 12 and an aperture 10 with its corresponding small bore hole 11 in plate 3. While the hole 11 is cylindrical, the aperture 10 is conical. The $TiCl_4$ feed pipe 12 consists of two tubes 13 and 14 arranged concentrically within each other and connected to each other at their upper ends by a tight fit. Below this tight fit the inner tube 13 is reduced in diameter to provide an annular gas chamber 15 between the inner and outer tubes which channel 15 is connected with the chamber 8 of the burner manifold by several radial openings 16. The inner tube 13 extends above the upper end of the outer tube 14 and is enclosed by a cap-like housing 17 having one or more tangential passages 18 connecting the housing 17 with the chamber 9 of the burner manifold. Between the upper edge 19 of inner tube 13 and the top plate 20 of the housing 17 an annular space 21 is formed. The bore of the inner tube 13 is constricted adjacent its lower end and below this constriction 22 the bore of the inner tube 13 is widened in trumpet shape so as to form, in effect, a venturi in the lower end of the inner tube 13. The bore of the outer tube 14 is also flared outwardly at the exit end thereof. If necessary, spacing rings 23 may be used for mantaining the inner and outer tubes in concentric relationship.

Referring to FIG. 1 a gas mixture comprising carbon monoxide and oxygen is fed by feed pipe 24 into the chamber 7 of the burner manifold from whence it passes through the small bore holes 11 of the plate 3 into the apertures 10 of the gas permeable plate 2. Here the combustion of the carbon monoxide takes place. The hot combustion gases containing free oxygen then issue from the gas permeable plate 2 into the reaction chamber 1. Through feed pipe 25 carbon monoxide which may be mixed with an inert gas, as the case may be, is fed into the chamber 8 of the burner manifold from whence the gas passes through the radial openings 16 of the outer tubes 14 of the $TiCl_4$ feed pipes into the annular gas channels 15 and from thence into the reaction chamber 1. Through the feed pipe 26 gaseous titanium tetrachloride is fed into the chamber 9 of the burner manifold and from thence through the tangential passages 18 of the housings 17 into the inner tube 13 whereby a rotary movement is given to the gaseous $TiCl_4$. The flow of gaseous titanium tetrachloride will be restricted by the annular space 21 whereby the $TiCl_4$ gas stream will be homogenized as it passes into tube 13 and from thence into the reaction chamber 1.

The widening of the bore of the inner tube 13 at its mouth causes a firm adherence of the stream of gaseous titanium tetrachloride to the tube wall so that here titanium dioxide deposits are avoided with certainty. The reaction gases burdened with the titanium dioxide are discharged from the bottom of the reaction chamber. In order to maintain the reaction chamber wall free of $TiO_2$ deposits a cold gas is blown in through several tangential inlets 27.

Referring again to FIG. 3 the tapered sides of the apertures 10 should in general not be inclined more than 20° towards the axes of the apertures. It will be understood however that the apertures 10 may be formed also cylindrically in which case their length should be at least three times their diameter, preferably at least five times. As mentioned above the diameters of the apertures 10 must be essentially larger than the diameters of the corresponding small bore holes 11 in the plate 3 while the bore holes 11 must be large enough to insure an adequate distribution of gas to the apertures 10 and yet small enough to preclude back-firing. In general, they should not have a diameter larger than 2 mm.

The venturi-type constriction 22 in the inner tube 13 may be omitted but in any event the inner diameter of the inner tube 13 at its mouth should always be expanded so as to be at least 1.2 times the inner diameter of the bore at the narrowest part of the inner tube 13.

The $TiCl_4$ feed pipes 12 should extend into the reaction chamber 1 a maximum distance of half the diameter of the bore of the inner tube 13. Also tube 13 and tube 14 may terminate in the same horizontal plane or one tube may extend slightly beyond the other tube.

EXAMPLE

A device similar to that disclosed in the drawing was employed, wherein a burner manifold having chambers 7, 8 and 9 each having an I.D. of 100 mm. was mounted on a reaction chamber 1 the inner diameter of which was 120 mm. The gas permeable plate 2 had a thickness of 50 mm. and consisted of a refractory ceramic material. Above it was an iron plate 3 of 10 mm. thickness. A $TiCl_4$ feed pipe 12 was located at the center of the gas permeable plate 2 and extended therethrough 5 mm. into the reaction chamber 1. That portion of the $TiCl_4$ feed pipe 12 supported by the plate 2 and 3 was surrounded by 24 apertures 10, 11 arranged in the form of concentric circles of 12 apertures each with circular diameters of 40 and 80 mm. respectively. The holes 11 had diameters of 1.5 mm., while the apertures 10 were tapered the uppermost diameter being 3 mm. and the lowermost diameter 12 mm.

The inner tube 13 of the $TiCl_4$ feed pipe 12 had a length of 180 mm. and a wall thickness in its cylindrical part of 2 mm. its inner diameter being 18 mm. which was narrowed to 10 mm. by the constriction 22, 25 mm. above its mouth. Below the constriction the bore of the inner tube 13 was flared out in such a way that its boundary surface, in longitudinal section, constituted an arc having a radius of 20 mm. the diameter of the bore at its mouth being 30 mm. The housing 17 of the feed pipe 12 had an inner diameter of 71 mm., a tangential opening 18 having a cross-section of 80 sq. mm. and an annular space 21 of 5 mm. width. The inner tube 13 and outer tube 14 formed an annular channel 15 2 mm. wide which was connected with chamber 8 by 12 radical openings 16 of 5 mm. diameter each.

Through the feed pipe 24 8 standard cu. m./hr. of a gas mixture comprising 3 parts by volume of oxygen at 250° C. and 1 part by volume of carbon monoxide at 50° C. were introduced into the burner manifold and burned in the apertures 10 of plate 2 to produce hot combustion gases plus free oxygen in the reaction chamber. At the same time 2 standard cu. m. per hr. carbon monoxide of 50° C. was fed into the annular channel 15 while a mixture of 25 kg./hr. titanium tetrachloride and 1.15 kg./hr. aluminum chloride (corresponding to 4% $Al_2O_3$ calculated on the basis of pigment) was fed through inner tube 13 at a temperature of 320° C. into the reaction chamber where the rotating stream of gaseous $TiCl_4$ was surrounded by a mantle or sheath of CO which ignited to form a flame encircling the $TiCl_4$ stream at a predetermined distance below the underside of the gas permeable plate 2. Here the gaseous $TiCl_4$ reacted with the free oxygen to form pigmentary $TiO_2$. In order to maintain the chamber wall free of deposits, a total of 20 standard cu m./hr. air at room temperature were introduced through 4 tangential tubes 27.

The reaction was carried out without trouble and was completed at 250 mm. distance from the underside of the gas permeable plate 2. A rutile pigment of good quality that contained no detectable amounts of anatase (limit of detection for X-ray determination: 0.3%) was obtained.

The chamber wall and the gas permeable plate 2 were largely free of titanium dioxide deposits.

The annular space 21 could be varied between 5 and 10 mm. for control of the titanium tetrachloride rotary movement and 25 to 50 kg. per hr. titanium tetrachloride could be put through via feed pipe 12. It is possible, without any difficulty, to process larger amounts of titanium tetrachloride in correspondingly larger devices with a correspondingly greater number of apertures 10, 11 using a plurality of inlet tubes 12.

While this invention has been described and illustrated by the examples shown, it is not intended to be strictly limited thereto, and other variations and modifications may be employed within the scope of the following claims.

We claim:
1. Apparatus for producing fine particle size titanium dioxide by the reaction of gaseous $TiCl_4$ with oxygen in the presence of auxiliary heat produced by the combustion of CO and oxygen said apparatus comprising a reaction chamber, an end-closure member at the upper end of said reaction chamber said end-closure member having a plurality of gas passages therein in communication with said reaction chamber, a multi-chambered burner manifold arranged to be superposed on said end-closure member and having passages therein in communication with the gas passages in said end-closure member, feed means arranged to feed said auxiliary heat-producing combustible gases into a first chamber of said manifold for producing hot combustion gases therein the gas passages in said end-closure member being constructed and arranged so that the hot combustion gases formed in said first chamber of said burner manifold issue therefrom into said reaction chamber, and a plurality of $TiCl_4$ feed pipes supported by said end-closure member within a second chamber of said manifold and arranged to feed gaseous $TiCl_4$ into said reaction chamber, each feed pipe comprising two concentric tubes constructed and arranged to provide an annular gas passage therebetween, means arranged to feed gaseous $TiCl_4$ into the second chamber of said burner manifold and from thence into the inner tube of each $TiCl_4$ feed pipe and means arranged to feed gaseous CO into a third chamber of said burner manifold and from thence into the annular gas passage between said inner tube and the outer tube of each $TiCl_4$ feed pipe to form a mantle of gaseous CO surrounding the stream of gaseous $TiCl_4$ issuing from each inner tube into said reaction chamber.

2. Apparatus for producing fine particle size titanium dioxide according to claim 1 wherein the means for feeding gaseous $TiCl_4$ from the second chamber of said multi-chambered manifold into the inner tube of each $TiCl_4$ feed pipe comprises a cap-like housing arranged on the upper end of each $TiCl_4$ feed pipe, each cap-like housing having a tangentially oriented inlet in communication with the second chamber of said multi-chambered manifold.

3. Apparatus for producing fine particle size titanium dioxide according to claim 1 wherein the outer wall of the inner tube and the inner wall of the outer tube of each $TiCl_4$ feed pipe are flared outwardly at the exit end of said $TiCl_4$ feed pipe whereby the gases issuing from said annular gas passages are diffused outwardly radially therefrom.

4. Apparatus for producing a fire particle size titanium dioxide according to claim 1 wherein a constriction is provided adjacent the lower end of the bore of the inner tube of each $TiCl_4$ feed pipe and the exit end of said bore is expanded to at least 1.2 times the inner diameter of its constriction.

5. Apparatus for producing fine particle size titanium dioxide according to claim 4 wherein the lower end of the inner tube comprises a venturi.

6. Apparatus for producing fine particle size titanium dioxide according to claim 1 wherein said end-closure member comprises a ceramic plate having a plurality of gas passages extending therethrough.

7. Apparatus for producing fine particle size titanium dioxide according to claim 6 wherein said ceramic plate comprises a ceramic frit.

8. Apparatus for producing fine particle size titanium dioxide according to claim 6 wherein said gas passages comprise cylindrical apertures the length of each aperture being at least three times its diameter.

9. Apparatus for producing fine particle size titanium dioxide according to claim 6 wherein said gas passages comprise conical apertures the walls of which slope downwardly and outwardly relative to the top side of said end-closure member.

10. Apparatus for producing fine particle size titanium dioxide according to claim 9 wherein the slope of the conical walls of the said apertures is no more than about 20° to the longitudinal axes thereof.

References Cited

UNITED STATES PATENTS

| | | | |
|---|---|---|---|
| 2,394,633 | 2/1946 | Pechukas et al. | 23—202(V) |
| 2,635,946 | 4/1953 | Weber et al. | 23—277X |
| 2,957,753 | 10/1960 | Nelson et al. | 23—277X |
| 3,068,113 | 12/1962 | Strain et al. | 23—277X |
| 3,078,148 | 2/1963 | Belknap et al. | 23—277X |
| 3,086,851 | 4/1963 | Wagner | 23—277 |
| 3,361,525 | 1/1968 | De Rycke et al. | 23—277UX |
| 3,385,665 | 5/1968 | Peacock et al. | 23—202(V) |
| 3,403,001 | 9/1968 | Mas et al. | 23—277X |
| 3,416,892 | 12/1968 | Hitzemann et al. | 23—202(V) |
| 3,438,720 | 4/1969 | Cleaver | 23—277X |

MORRIS O. WOLK, Primary Examiner

B. S. RICHMAN, Assistant Examiner

U.S. Cl. X.R.

23—202, 284

UNITED STATES PATENT OFFICE
CERTIFICATE OF CORRECTION

Patent No. 3,586,489          Dated June 22, 1971

Inventor(s) Giovanni Hilgers et al

It is certified that error appears in the above-identified patent and that said Letters Patent are hereby corrected as shown below:

Column 1, after line 8, should read:

-- Claims priority, application Germany, September 21, 1967, No. T-34837 IVa/12n --.

Signed and sealed this 12th day of December 1972.

(SEAL)
Attest:

EDWARD M. FLETCHER, JR.　　　　　　ROBERT GOTTSCHALK
Attesting Officer　　　　　　　　　Commissioner of Patents